United States Patent [19]
Ostwald

[11] Patent Number: 5,995,320
[45] Date of Patent: Nov. 30, 1999

[54] HORIZONTALLY ORIENTED AUTOLOADER FOR DATA STORAGE CARTRIDGES

[75] Inventor: Timothy C. Ostwald, Louisville, Colo.

[73] Assignee: Storage Technology Corporation, Louisville, Colo.

[21] Appl. No.: 09/017,576

[22] Filed: Feb. 3, 1998

[51] Int. Cl.[6] .............................. G11B 15/68; G11B 17/22
[52] U.S. Cl. ............................................. 360/92; 369/36
[58] Field of Search ................................. 360/92; 369/36, 369/38

[56] References Cited

U.S. PATENT DOCUMENTS

| | | | |
|---|---|---|---|
| 4,772,968 | 9/1988 | Nonaka et al. | 360/92 |
| 4,817,070 | 3/1989 | Hug et al. | 369/36 |
| 4,835,634 | 5/1989 | Ostwald | 360/92 |
| 5,041,929 | 8/1991 | Fryberger et al. | 360/92 |
| 5,128,912 | 7/1992 | Hug et al. | 369/36 |
| 5,532,931 | 7/1996 | Erickson, Jr. et al. | 360/92 |
| 5,610,882 | 3/1997 | Dang | 369/36 |
| 5,612,934 | 3/1997 | Dang et al. | 369/36 |
| 5,615,202 | 3/1997 | Enomoto et al. | 369/36 |
| 5,742,570 | 4/1998 | Taki et al. | 369/36 |
| 5,841,744 | 11/1998 | Menke et al. | 369/36 |

*Primary Examiner*—Allen T. Cao
*Attorney, Agent, or Firm*—Duft, Graziano & Forest

[57] ABSTRACT

The horizontally oriented autoloader for data storage cartridges orients the data storage cartridges in a horizontally oriented loading bin, and occupies a vertical space consistent with the vertical dimensions of the associated cartridge drive. These features of the present autoloader thereby enable multiple autoloader equipped cartridge drives to be mounted in a vertical stack. This increases the effective utilization of the computer center floor space. In addition, the bookshelf design of the autoloader trays allows for easier loading and unloading of cartridges, with the data storage cartridges being maintained in the same order and orientation as they were in the manual storage racks from which they were removed. The horizontal data storage cartridge movement mechanism is spring loaded to attain higher performance without motor drive. Furthermore, smaller motors are used in the data storage loading mechanism than in the vertically oriented autoloader systems to implement the necessary autoloader functions while consuming less power.

19 Claims, 11 Drawing Sheets

HORIZONTALLY ORIENTED AUTOLOADER FOR DATA STORAGE CARTRIDGES

FIELD OF THE INVENTION

This invention relates to autoloader systems that function to automatically and sequentially load data storage cartridges from a preloaded bin into a cartridge drive without operator intervention to enable the reading and writing of data on the data storage medium that is located within the cartridges.

PROBLEM

It is a problem in the field of autoloader systems, that function to automatically and sequentially load magnetic tape cartridges from a stack into a tape drive, to provide storage densities per square foot of customer floor space consistent with industry needs. The typical autoloader system presently on the market uses a magazine loading strategy that complicates the loading process. These autoloader systems vertically orient either a stack of tape cartridges in a bin (such as that shown in U.S. Pat. No. 4,835,634) or a tape cartridge magazine (such as that shown in U.S. Pat. No. 5,041,929) which prevents the stacking of tape drives, as is well known in tape drive technology, especially due to the range of motion required to orient the magazine contents with the cartridge receiving opening in the tape drive. The vertically oriented magazine or bin prevents the provision of more than a single tape drive in a particular footprint on the floor of the computer center, thereby inefficiently using the expensive floor space of the computer center. Furthermore, the effects of gravity prevents the selection of a random tape cartridge since, in a vertically oriented stack load autoloader, the weight of the magnetic tape cartridges pressing down on the tape cartridges introduces too much friction to enable random selection of a tape cartridge from a stack and, in a magazine based vertically oriented autoloader, the cost of providing drive motors having sufficient power to raise the loaded magazine is prohibitively expensive.

There is a cost tradeoff in the election to use autoloader systems since the user must sacrifice the efficient use of floor space for the reduction in operator labor. Furthermore, the use of tape cartridge magazines can represent an additional labor cost since these magazines must be manually loaded and unloaded by the operators, thereby somewhat offsetting the cost savings of the autoloader system.

SOLUTION

Figure 10:
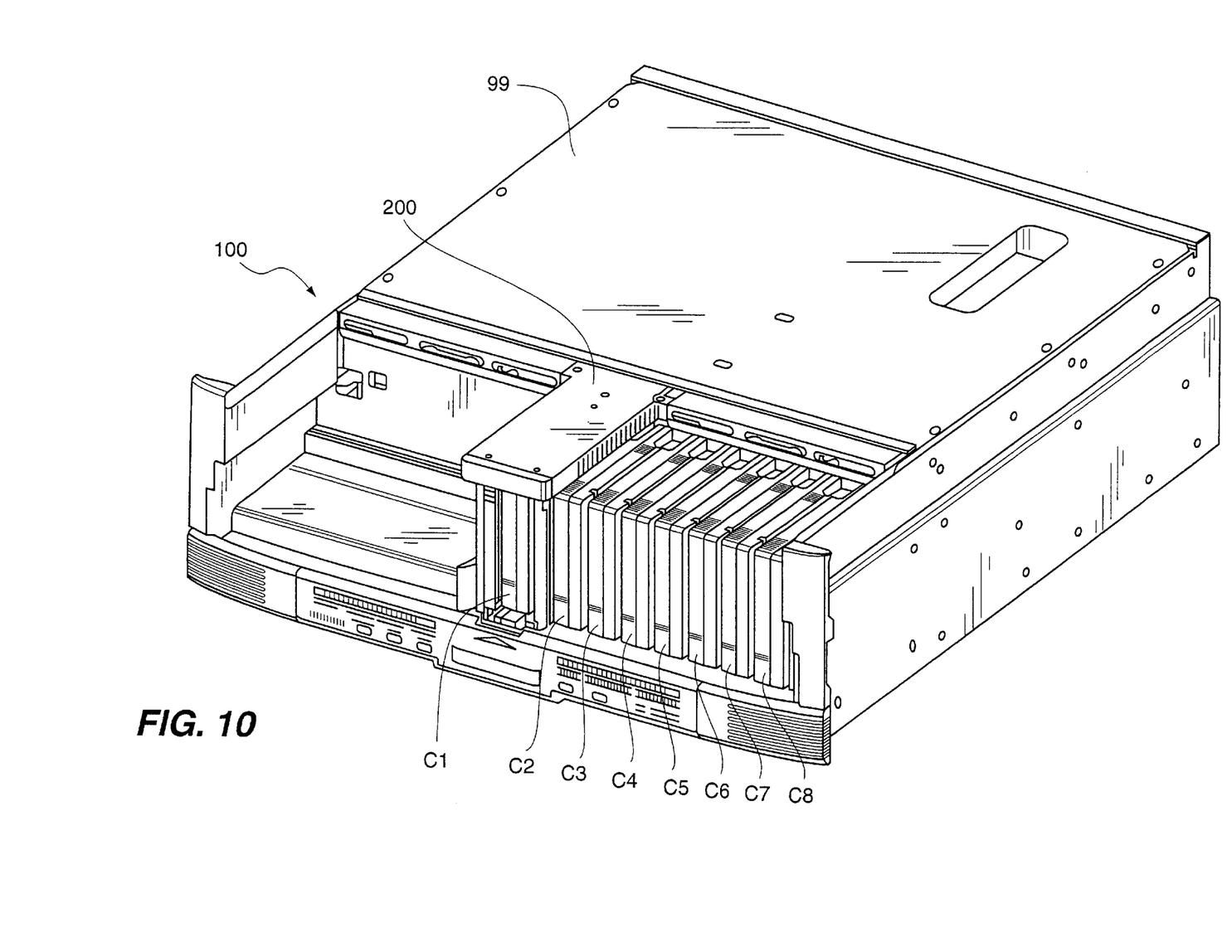
FIG. 10 illustrates a perspective drawing of the present horizontally oriented autoloader for data storage cartridges that contains a plurality of cartridges.
Figure 11:
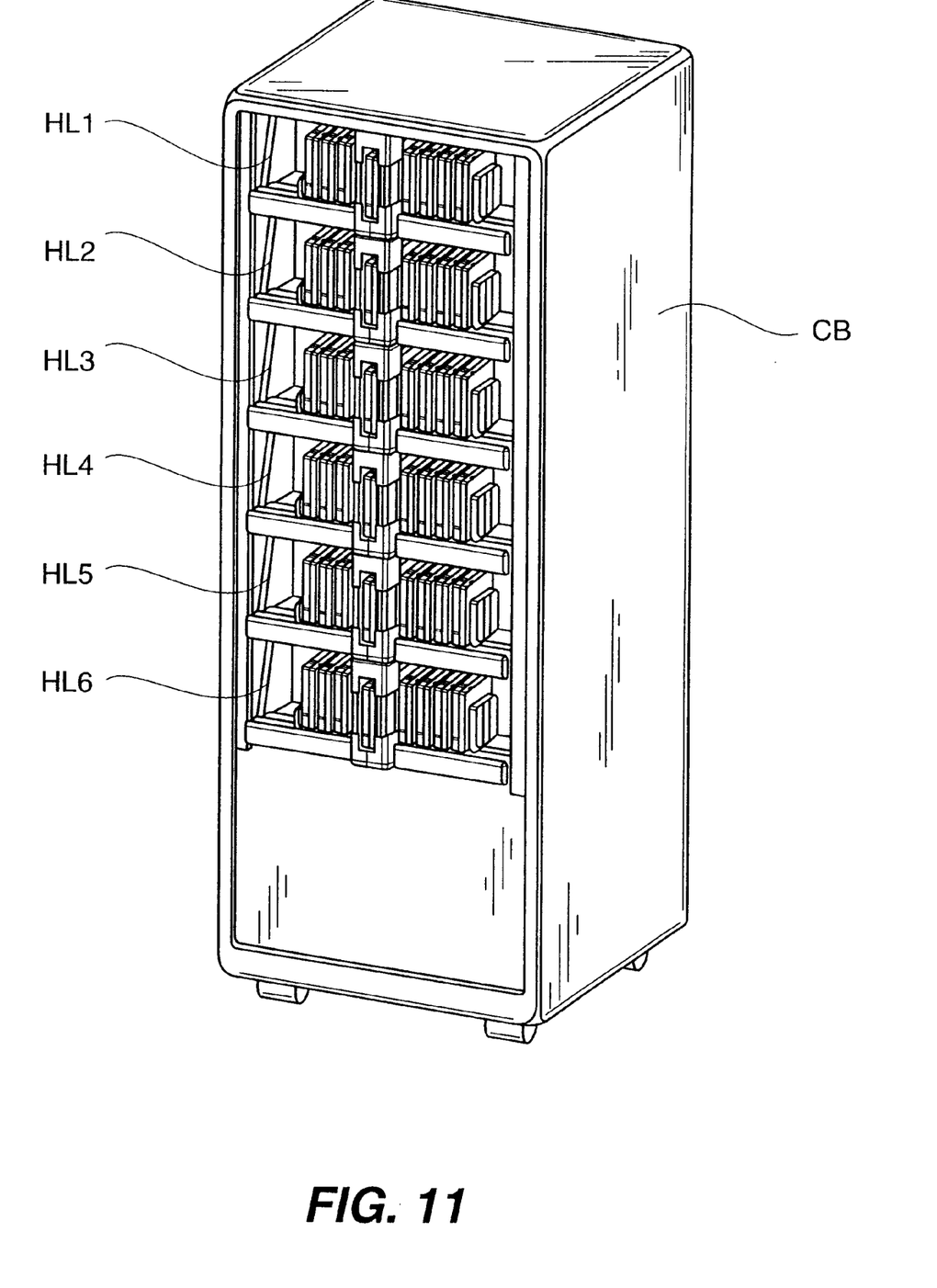
FIG. 11 illustrates a perspective drawing of a plurality of the present horizontally oriented autoloader for data storage cartridges as mounted on associated cartridge drives in a rack mounting arrangement.

The above-described problems are solved and a technical advance achieved by the present horizontally oriented autoloader for data storage cartridges. The present autoloader 100 as shown in FIG. 10 maintains the data storage cartridges C1–C8 in a horizontally oriented cartridge queue mechanism, consisting of an input tray and an output tray, and occupies a vertical space consistent with the vertical dimensions of the associated cartridge drive 99. These features of the present autoloader thereby enable multiple autoloader equipped cartridge drives HL1–HL6 to be mounted in a vertical stack in a cabinet CB, as shown in FIG. 11. This increases the effective utilization of the computer center floor space. In addition, the bookshelf design of the autoloader trays allows for easier loading and unloading of cartridges, with the data storage cartridges being maintained in the same order and orientation as they were in the manual storage racks from which they were removed prior to autoloading. The horizontal cartridge movement mechanism is spring loaded to attain higher performance without motor drive. Furthermore, smaller motors are used in the cartridge loading mechanism than in the vertically oriented autoloader systems to implement the necessary autoloader functions thereby consuming less power and being implemented at a reduced cost. The force required to move the data storage cartridges is greatly reduced in this architecture, since there is no need to overcome gravity and support the weight of numerous data storage cartridges in the autoloader. This greatly reduced load enables the autoloader to move data storage cartridges more quickly without the pinch points found in vertically oriented autoloaders where the operator can suffer injury to the fingers.

DETAILED DESCRIPTION

Figure 1:
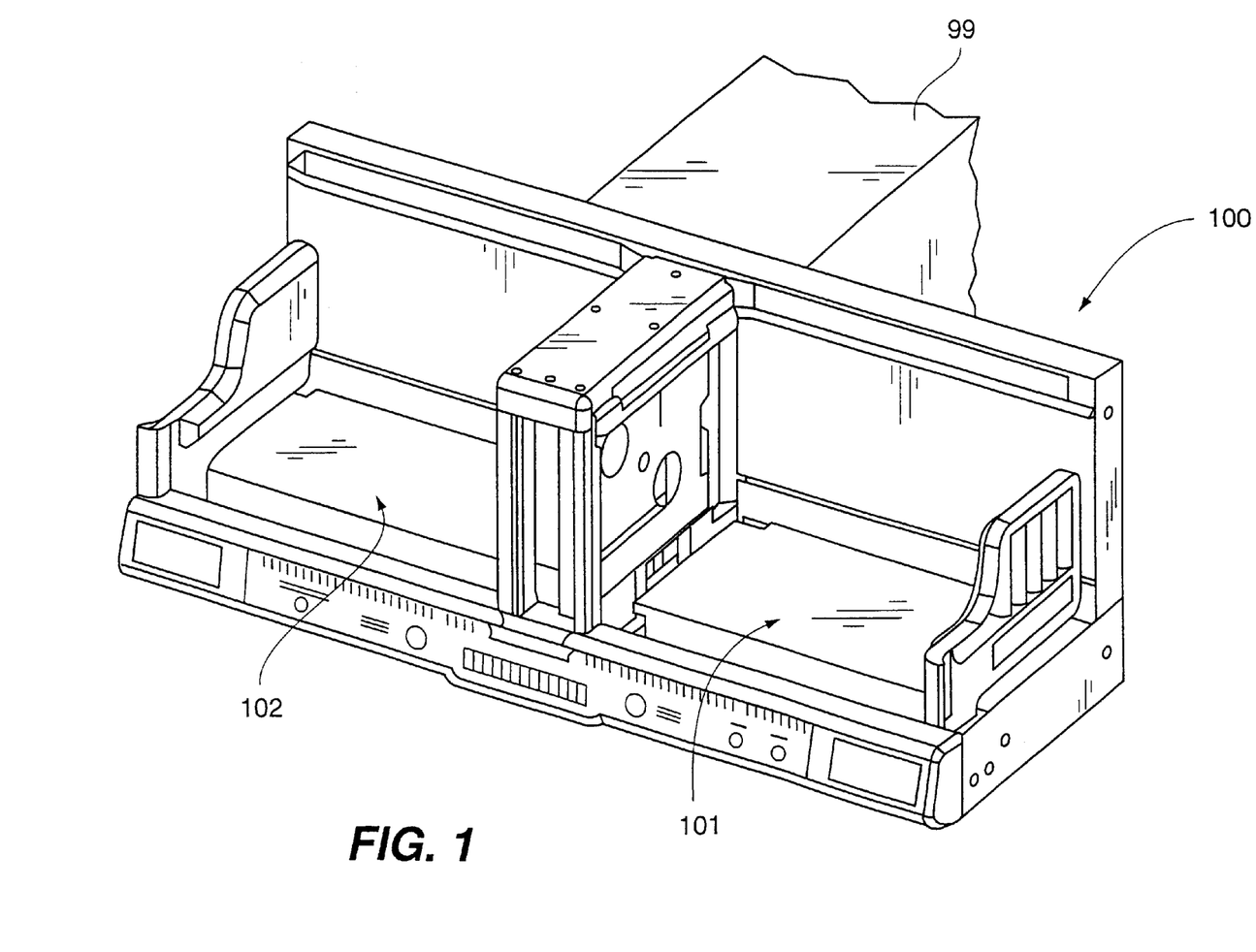
FIG. 1 illustrates a perspective drawing of the present horizontally oriented autoloader for data storage cartridges as mounted on an associated cartridge drive.
Figure 2:
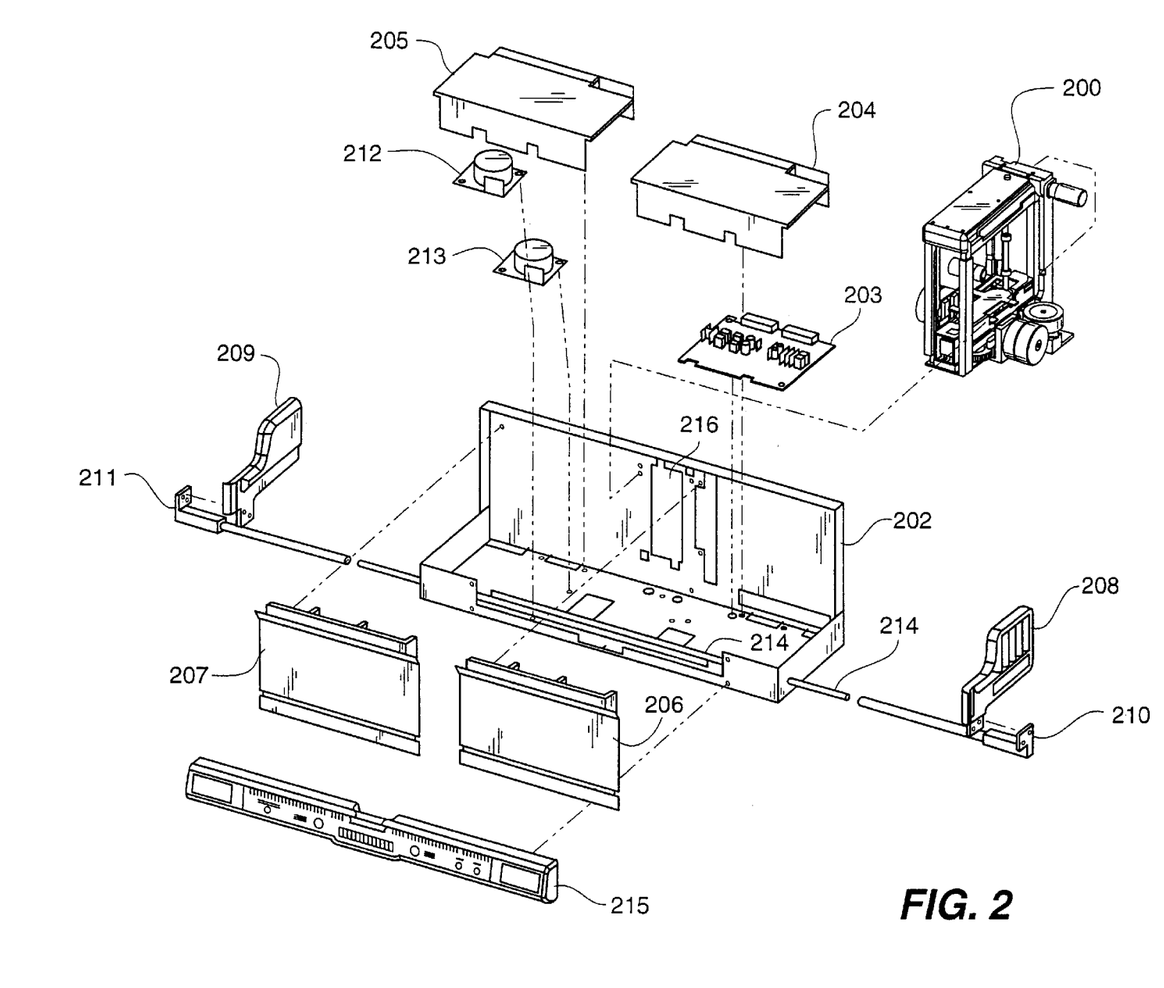
FIG. 2 illustrates a partially exploded perspective view of the present horizontally oriented autoloader for data storage cartridges.

The present horizontally oriented autoloader for data storage cartridges is illustrated in perspective view in FIGS. 1, 10 and in a partially exploded perspective view in FIG. 2. The present horizontally oriented autoloader for data storage cartridges 100 comprises a cartridge loading mechanism 200 mounted substantially in the middle of the autoloader 100 that receives data storage cartridges C1–C8 as loaded in the input tray 101 located on one side of the cartridge loading mechanism 200. The cartridges C1–C8 are serialized left to right so that they maintain the stored order from the shelf from which they are removed in remote cartridge storage rooms. The data storage cartridges typically used for this purpose are magnetic tape cartridges, such as the 3480-type magnetic tape cartridge that house a single reel of magnetic tape which is used to store data for associated computer systems.

The input tray 101 includes a slide mechanism 208 mounted at the end of the input tray 101 and which functions to push the data storage cartridges loaded in the input tray 101 into the cartridge loading mechanism 200 via an aperture located on a first side of the cartridge loading mechanism 200. The autoloader 100 is also equipped with an output tray 102 located on the other (second) side of the cartridge loading mechanism 200 to receive data storage cartridges that are processed by the cartridge loading mechanism 200. The output tray 102 is also equipped with a slide mechanism 209 that is moved away from the cartridge loading mechanism 200 by the movement of the data storage cartridges into the output tray 102 as they exit the cartridge loading mechanism 200. Thus, the autoloader 100 is equipped with a cartridge queue mechanism 101, 102 which comprises input tray 101 and output tray 102 to queue cartridges for loading into the cartridge loading mechanism 200 and to queue cartridges that are ejected from the cartridge loading mechanism 200. The autoloader 100 includes a control panel 215 mounted on the front thereof to enable the user to select various functions of the autoloader 100.

Exploded View of Autoloader

The autoloader 100 is constructed on an L-shaped frame 202, which has formed therein an aperture 216 which is aligned with a corresponding input aperture on the cartridge drive 99 to enable the cartridge loading mechanism 200 to load a data storage cartridge into the associated cartridge drive 99 and to receive the data storage cartridge from the associated cartridge drive 99 when the cartridge drive 99 has completed the reading/writing of data thereon. The frame 202 has mounted thereon two end plates 208, 209 that are connected to a bushing slider mechanism 210, 211 that enables smooth horizontal movement of the end plates 208, 209 on rods 214. No motors are used for data storage cartridge movement, since a pair of spring loaded cables 212, 213 provide the motive force. These spring loaded cables 212, 213 exert a force on the end plates 208, 209 to bias the end plates 208, 209 in the direction of the cartridge loading mechanism 200. There is no inertia or gravity to overcome in this slide mechanism, so the spring loaded cables 212, 213 function to offset the friction of moving the data storage cartridges along the input tray 101 and the output tray 102. The end of each cable is connected to an associated one of the bushing sliders 210, 211 so the attached end plate 208, 209 is pulled in toward the cartridge loading mechanism 200. The data storage cartridge sliding surface comprises two sets of plates, one set comprising a pair of plates 204, 205 mounted on the base of the frame 202 to provide a horizontally oriented surface on which the data storage cartridges ride. This set of plates 204 205 also covers the spring loaded cable mechanism 212, 213 and circuit board 203 that has mounted thereon the control electronics for the autoloader system 100. The other set of plates comprises a pair of vertically oriented plates 206, 207 which provide a back surface against which the data storage cartridges ride.

Exploded View of Cartridge Loading Mechanism

Figure 3:
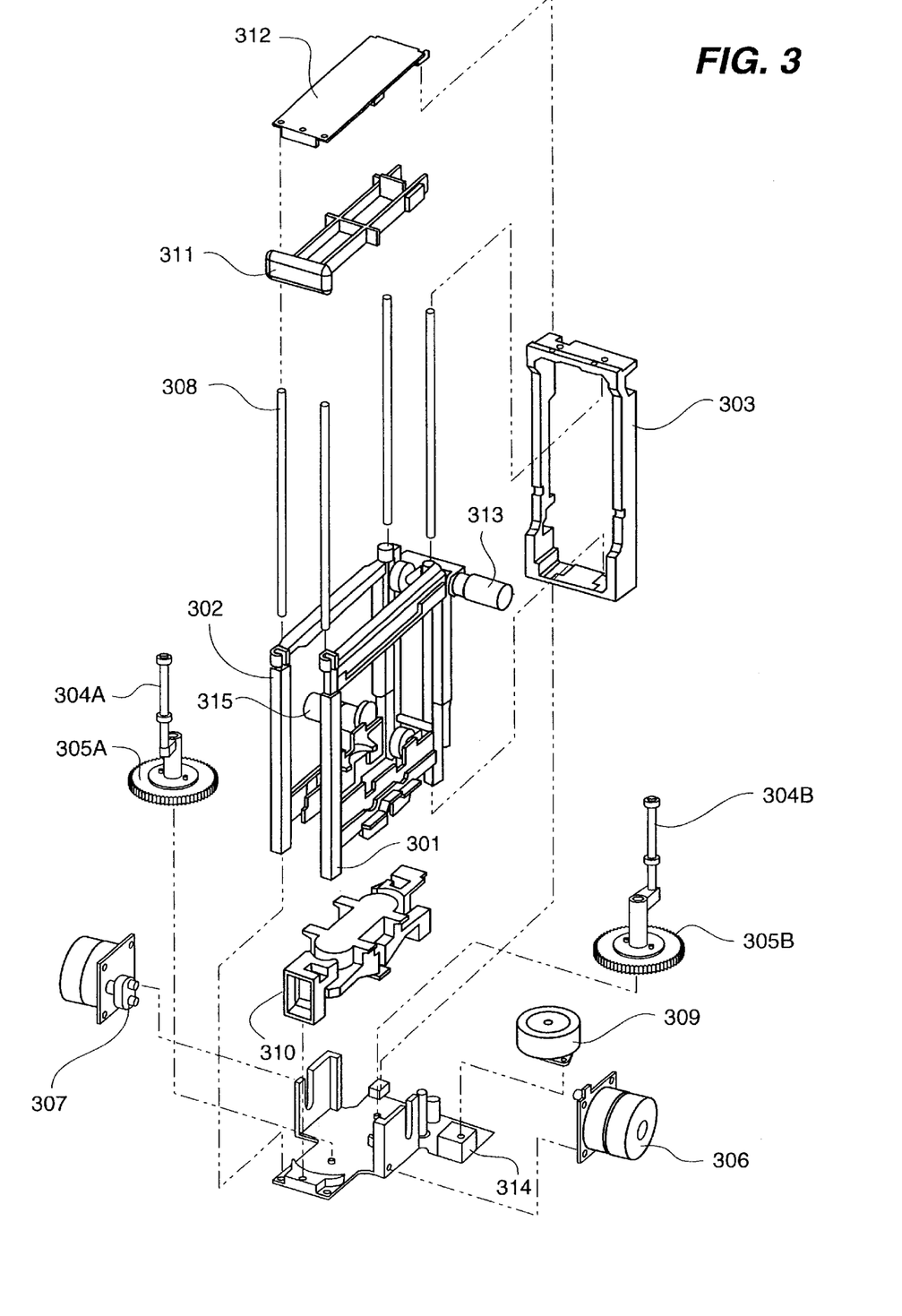
FIG. 3 illustrates an exploded perspective view of the cartridge loading mechanism of the present horizontally oriented autoloader for data storage cartridges.
Figure 4:
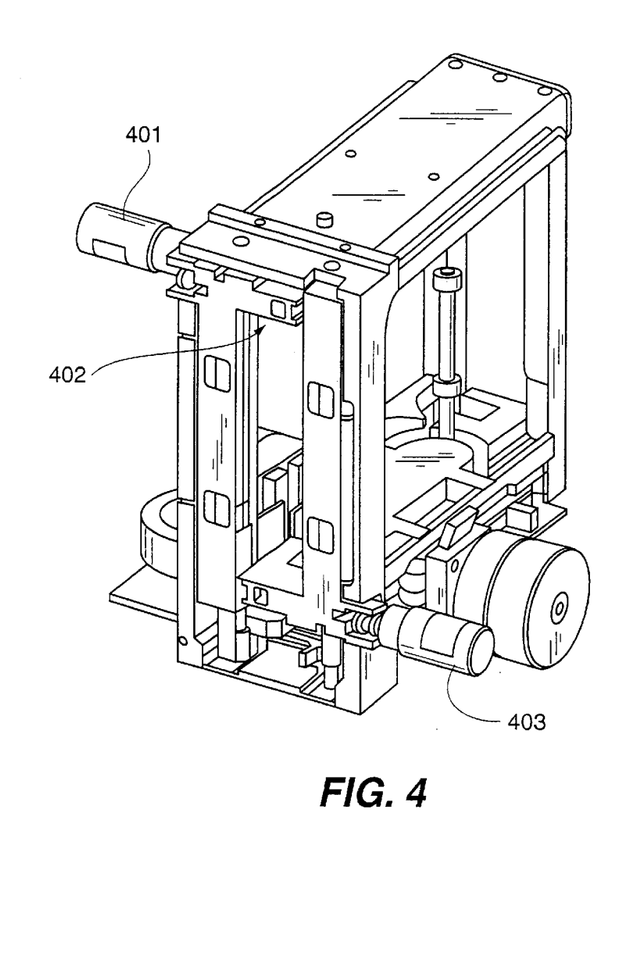
FIGS. 4 and 5 illustrate front and rear isometric views, respectively, of the cartridge loading mechanism of the present horizontally oriented autoloader for data storage cartridges.
Figure 5:
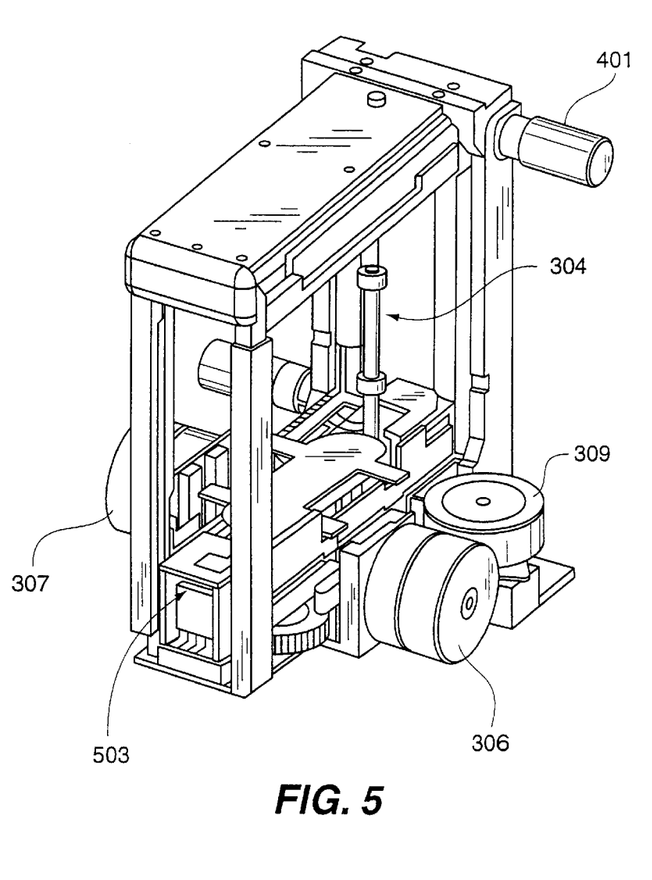

FIG. 3 illustrates an exploded perspective view of the cartridge loading mechanism 200 of the present horizontally oriented autoloader for data storage cartridges 100 and FIGS. 4 and 5 illustrate front and rear isometric views, respectively, of the cartridge loading mechanism 200 of the present horizontally oriented autoloader for data storage cartridges 100. The cartridge loading mechanism 200 comprises two sets of rectangular shaped gates 301, 302, mounted in a parallel oriented spaced apart relationship. The gates 301, 302 are oriented to receive a data storage cartridge into the inter-frame space from the input tray 101 and to eject a cartridge into the output tray 102. The data storage cartridges are loaded into the input tray 101 in bulk. The end plate 208 and the attached spring loaded cable 212 biases the leftmost data storage cartridge against the right side of the rightmost gate mechanism 301, which functions to block the leftward movement of the data storage cartridge until input gate mechanism 301 is activated to pass the data storage cartridge into the inter-frame space.

The mechanisms that form the input gate 301 and output gate 302 are symmetrical and operate in synchronization. Input gate motor 306 drives the input gate 301 while output gate motor 307 drives the output gate 302. The operation of the motors 306, 307 is synchronized so that the horizontal indexing can be allowed or disallowed as required. A pair of index rods 304A, 304B are provided and driven via their attached gears 305A, 305B by the index motor 309. The index rods 304A, 304B have a dual function, they drive out the old cartridge from the interframe space into the output tray 102 and guide/control the next cartridge from the input tray 101 into position between the input and output gates 301, 302. Also included in this mechanism are drive motors 401, 402 that are used to operate drive wheels 701, 702 (FIG. 7) which function to propel the data storage cartridge into the cartridge drive 99. Furthermore, a single cartridge load opening 503 is provided on the front side of the cartridge loading mechanism 200 to enable a user to place a single data storage cartridge directly into the cartridge loading mechanism 200 without having to use the input gate mechanism 301.

Operation and Structure of Gate Mechanism and Index Rods

Figure 6:
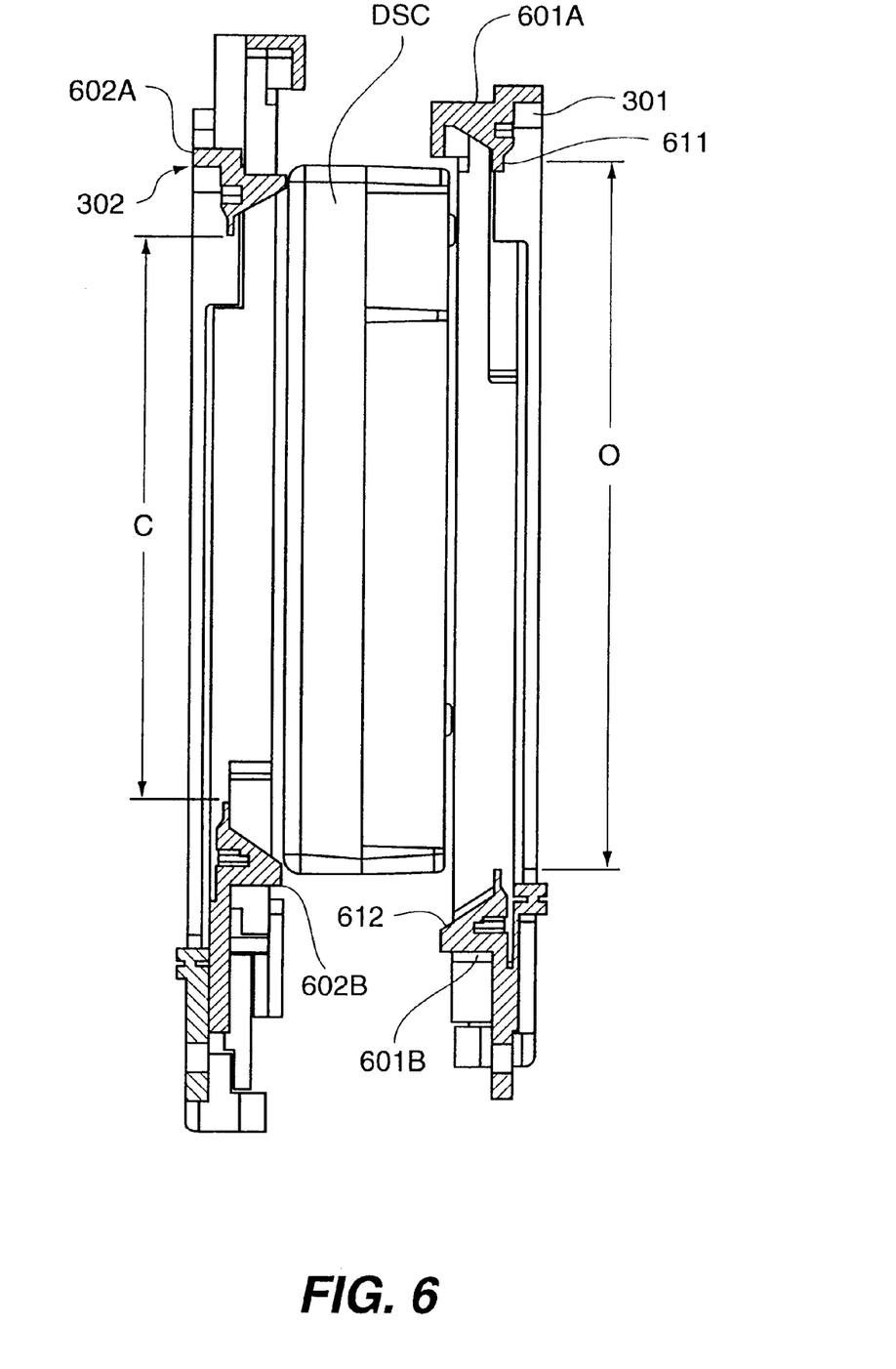
FIGS. 6 and 7 illustrate front and rear end views, respectively, of the cartridge loading mechanism of the present horizontally oriented autoloader for data storage cartridges.
Figure 7:
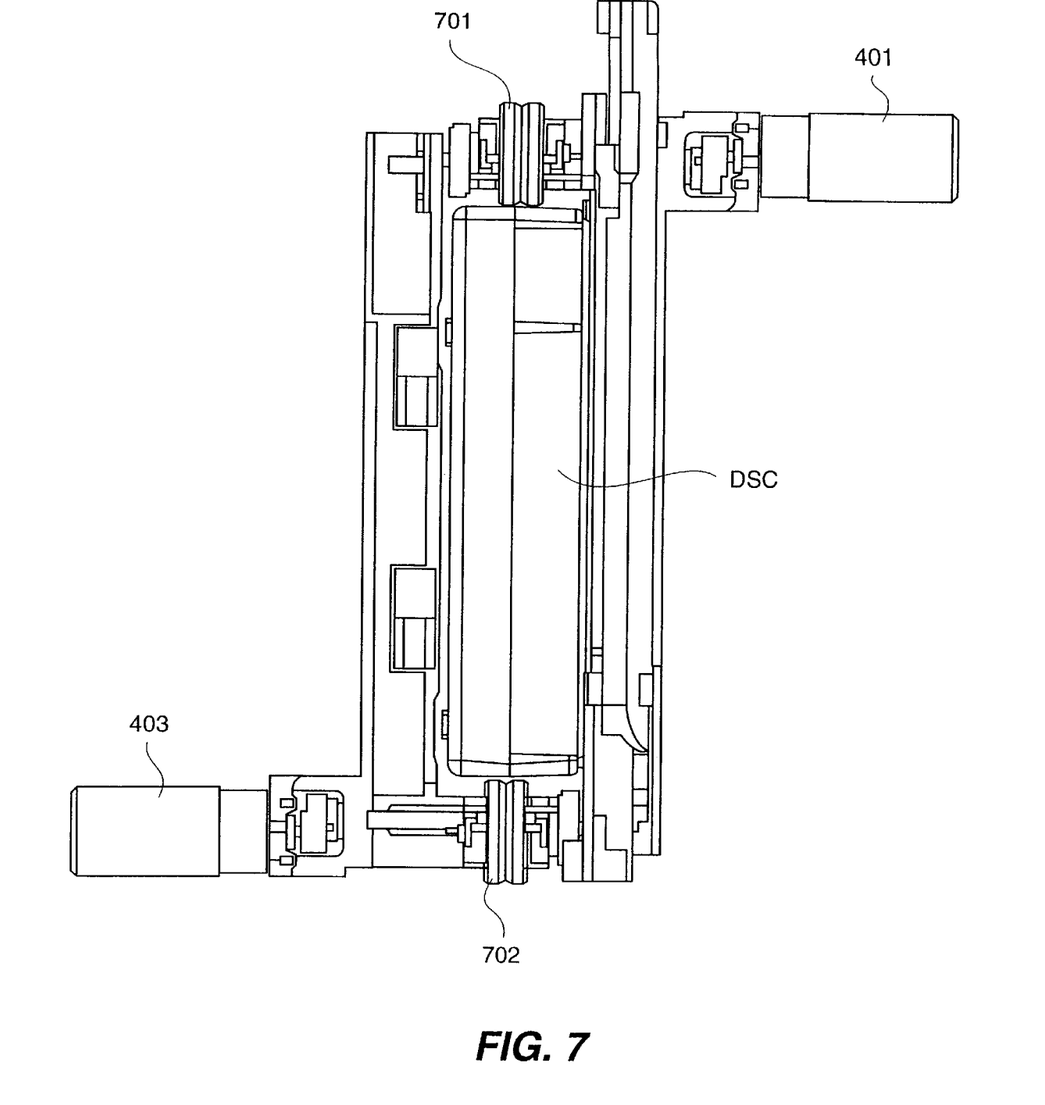
Figure 8:
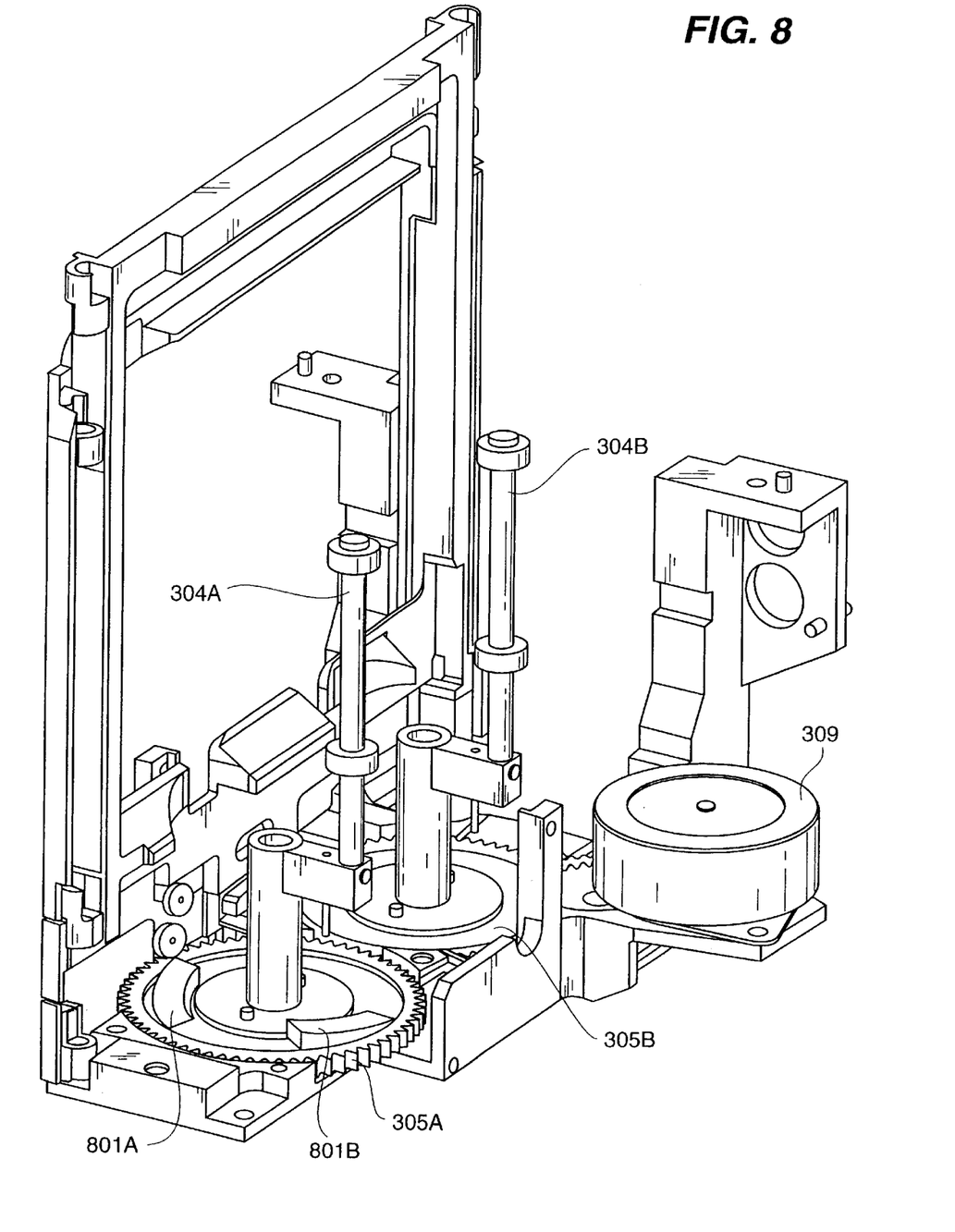
FIG. 8 illustrates an exploded view of a portion of the cartridge loading mechanism of the present horizontally oriented autoloader for data storage cartridges.

FIGS. 6 and 7 illustrate front and rear end views, respectively, of the cartridge loading mechanism 200 while FIG. 8 illustrates an exploded view of a portion of the cartridge loading mechanism 200 of the present horizontally oriented autoloader for data storage cartridges 100. The operation of the input and output gates 301, 302 is shown in FIG. 6 where the input gate 301 is in a first or open position to present an aperture of extent O to thereby enable data storage cartridge DSC to pass through the input gate 301 while the output gate 302 is in a second or closed position to present an aperture of extent C to thereby prevent data storage cartridge DSC from passing through the output gate 302. The input and output gates 301, 302 include fingers 601A, 601B and 602A, 602B, respectively which are equipped with blade elements 611. The movement of the fingers in the vertical direction sizes the aperture to either block or pass the data storage cartridge DSC. The blade elements 611 function to separate the data storage cartridge DSC from a data storage cartridge that is located juxtaposed to the data storage cartridge DSC on the other side of the input gate 301 or the output gate 302. Furthermore, each of the fingers 601A, 601B, 602A, 602B is formed with a sloping feature 612 that functions to center the data storage cartridge DSC between the input gate 301 and output gate 302 when these are both closed, thereby aligning the data storage cartridge DSC with the aperture 216 in the back of the autoloader 100 and thereby in alignment with a corresponding input aperture formed in the cartridge drive 99 to enable inputting of cartridges into the cartridge drive 99.

Separate gate drive motors 307, 309 are used to control the movement of the input gate 301 and output gate 302. Control electronics located on circuit board 203 controls the synchronization of operation of the various mechanisms in this instance. Alternatively, the operation of the input gate 301, output gate 302, index rods 304A, 304B are coordinated by the use of a set of gears that are shown in FIG. 8. A single drive motor 309 functions to activate this mechanism. In particular, the drive motor 309 causes the gears 305A, 305B to rotate, thereby moving the index rods 304A, 304B through a range of motion that is defined by their particular shape and mounting location on the drive gears 305A, 305B. The particular movement of the index rods 304A, 304B is described below. In addition, the gear 305A has formed on the top surface thereof cam features 801A, 801B that function to activate the input gate 301 and output gate 302 in the proper sequence and timing relationship. Thus, the opening and closing of the input gate 301, movement of the index rods 304A, 304B and opening and closing of the output gate 302 are controlled by the movement of the drive gears 305A, 305B.

Method of Operation of Autoloader

Figure 9A:
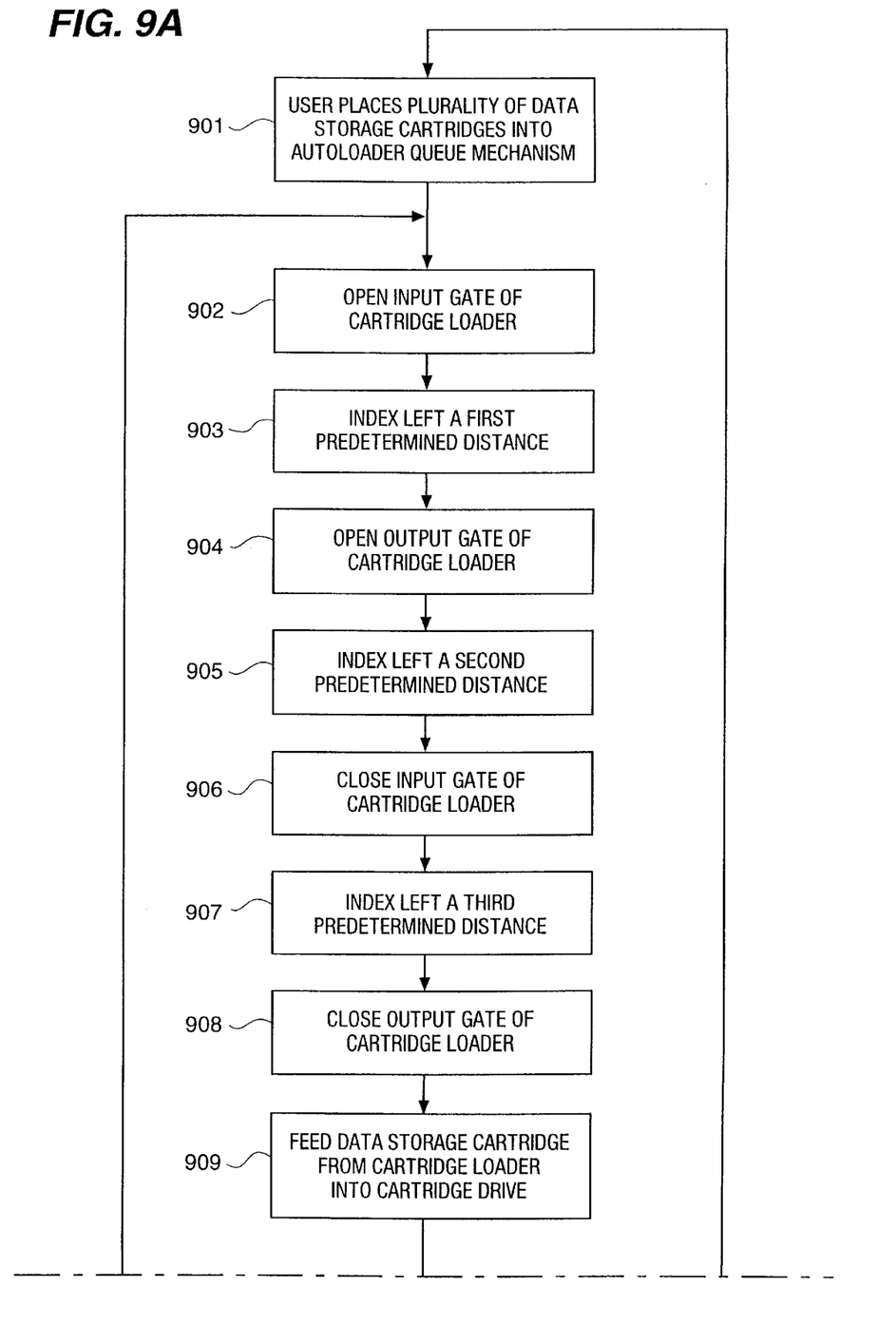
FIGS. 9A, 9B illustrate in flow diagram form the operation of the present horizontally oriented autoloader for data storage cartridges.
Figure 9B:
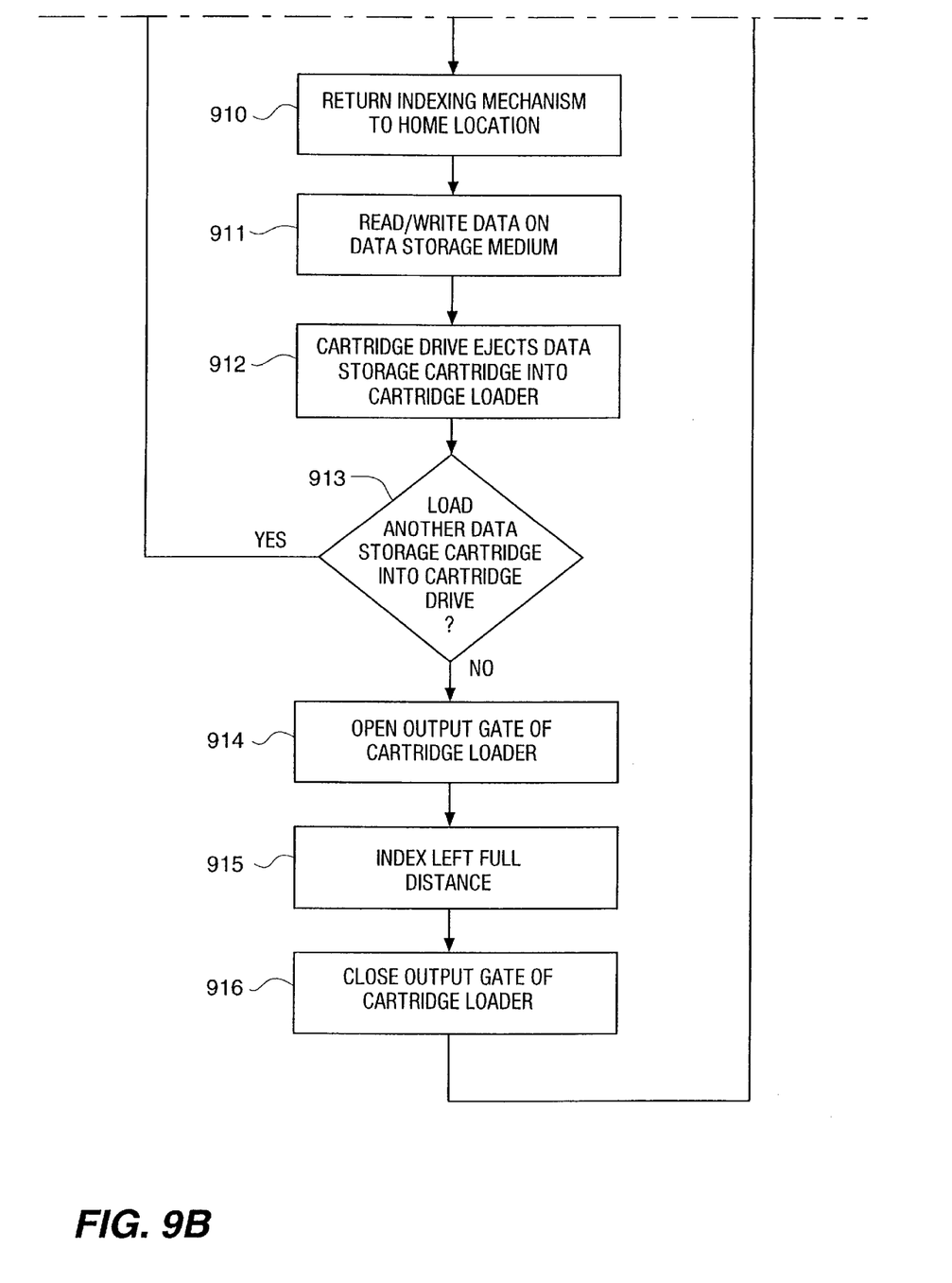

FIGS. 9A, 9B illustrate in flow diagram form the operation of the present horizontally oriented autoloader for data storage cartridges 100. At step 901, the user places plurality of data storage cartridges C1–C8 into the input tray section 101 of the autoloader queue mechanism 101,102 for reading and/or writing data on to the data storage medium contained within each of the data storage cartridges by the cartridge drive 99. At step 902, the cartridge loading mechanism 200 opens the input gate 301 of the cartridge loading mechanism 200 to thereby enable a first (leftmost) of the plurality of data storage cartridges loaded in the input tray 101 of the cartridge queue mechanism 101, 102 to be presented for loading into the cartridge loading mechanism 200. This is effected at step 903 by operating the index rods 304A, 304B to relocate the index rods 304A, 304B a first predetermined distance in the leftward direction, from a location juxtaposed to the input gate 301 toward the interior portion of the cartridge loading mechanism 200. This first indexing motion of the cartridge loading mechanism 200 functions to place pressure on a data storage cartridge that is located in the interior portion of the cartridge loading mechanism 200, having been ejected therein by the cartridge drive 99. At step 904, the cartridge loading mechanism 200 opens the output gate 302 of the cartridge loading mechanism 200 and, at step 905, relocates the index rods 304A, 304B left a second predetermined distance. This movement of the index rods 304A, 304B forces the data storage cartridge that was located within the cartridge loading mechanism 200 out the output gate 302 and simultaneously enables the next data storage cartridge to enter the interior space of the cartridge loading mechanism 200. By closing the input gate 301 of the cartridge loading mechanism 200 at step 906, this selected cartridge is separated from the rest of the data storage cartridges located in the input tray 101 of the cartridge queue mechanism 101, 102 by operation of the blade elements 611 that are located on the top and bottom of the input gate mechanism 301. At step 907, the cartridge loading mechanism 200 relocates the index rods 304A, 304B left a third predetermined distance and closes output gate 302 of the cartridge loading mechanism 200 at step 908, where the blade elements 611 that are located on the top and bottom of the output gate 302 separate this data storage cartridge from the data storage cartridge that is loading into the cartridge drive 200.

At step 909, the cartridge loading mechanism 200 feeds the data storage cartridge from the cartridge loading mechanism 200 into the cartridge drive 99 by activating feed motors 401, 403 to drive feed wheels 701, 702 to engage and propel the data storage cartridge through the aperture 216 in the back of the autoloader 100 into the corresponding input aperture of the cartridge drive 99. The closure of the input and output gates 301, 302 engage the drive feed wheels 701,702 with the data storage cartridge DSC located in the cartridge loading mechanism 200. At step 910, the cartridge loading mechanism 200 returns the index rods 304A, 304B to the home location juxtaposed to the input gate 301 to be prepared to process the next data storage cartridge and/or the data storage cartridge that is presently loaded in the cartridge drive 99. Data is read from or written to the data storage medium contained within the data storage cartridge that has been loaded into the cartridge drive 99 at step 911.

Once the data processing has been completed, at step 912 the cartridge drive 99 ejects the data storage cartridge into the cartridge loading mechanism 200 and, at step 913, a determination is made whether there is another data storage cartridge that must be loaded into the cartridge drive 200. If another data storage cartridge must be loaded into the cartridge drive 200, processing returns to step 902 and repeats the process of steps 902–913. If not, the single data storage cartridge located in the cartridge loading mechanism 200 must be ejected therefrom so at step 914, the cartridge loading mechanism 200 opens output gate 302 of cartridge loading mechanism 200 and, at step 915, the cartridge loading mechanism 200 indexes the index rods 304A, 304B left the full distance to push the data storage cartridge through the output gate 302 into the output tray 102 of the cartridge queue mechanism 101, 102. At step 916 the cartridge loading mechanism 200 closes the output gate 302 of the cartridge loading mechanism 200 and returns to the idle state.

SUMMARY

Thus, the present autoloader enable multiple autoloader equipped cartridge drives to be mounted in a vertical stack by maintaining the data storage cartridges in a horizontally oriented cartridge queue mechanism, consisting of an input tray and an output tray, to occupy a vertical space consistent with the vertical dimensions of the associated cartridge drive. This increases the effective utilization of the computer center floor space. In addition, the bookshelf design of the autoloader trays allows for easier loading and unloading of cartridges, with the data storage cartridges being maintained in the same order and orientation as they were in the manual storage racks from which they were removed prior to autoloading.

What is claimed:

1. An autoloader apparatus for automatically loading data storage cartridges into an associated cartridge drive via a cartridge input aperture formed in said cartridge drive, comprising:

cartridge loading means fixably mounted juxtaposed to said cartridge input aperture, having a first side and a second side, for receiving a data storage cartridge via said first side for loading said data storage cartridge into said associated cartridge drive via said cartridge input aperture, said first side and said second side being located on opposite sides of said cartridge loading means along a horizontal axis;

cartridge queue means oriented along said horizontal axis and juxtaposed to both said first side and said second side of said cartridge loading means and comprising:

means for presenting a plurality of data storage cartridges, one at a time, to said cartridge loading means at said first side thereof, and means for receiving a plurality of data storage cartridges ejected one at a time from said cartridge loading means at said second side thereof.

2. The apparatus of claim 1 wherein said cartridge loading means comprises:

first aperture means formed in said first side of said cartridge loading means and operable to controllably present an opening to enable a one of said data storage cartridges to pass through from said cartridge queue means to an interior portion of said cartridge loading means; and second aperture means formed in said second side of said cartridge loading means and operable to controllably present an opening to enable a one of said data storage cartridges to pass through from an interior portion of said cartridge loading means to said cartridge queue means.

3. The apparatus of claim 2 wherein said cartridge loading means further comprises:

drive roller means operable to drive said data storage cartridge from said interior portion of said cartridge loading means into said cartridge drive via said cartridge input aperture.

4. The apparatus of claim 3 wherein said drive roller means is operable to retrieve said data storage cartridge from said cartridge drive into said interior portion of said cartridge loading means.

5. The apparatus of claim 2 wherein said first and said second aperture means comprises:

gate means operable to switch between a first position which creates an aperture of extent sufficient to enable a one of said data storage cartridges to pass through said aperture and a second position which creates an aperture of extent insufficient to enable a one of said data storage cartridges to pass through said aperture.

6. The apparatus of claim 5 wherein said gate means comprises:

cartridge indexing means for separating a data storage cartridge from at least one adjacent cartridge located in said cartridge queue means at said first side of said cartridge loading means.

7. The apparatus of claim 5 wherein said gate means further comprises:

cartridge locating means for centering said data storage cartridge in said interior portion of said cartridge loading means to align said data storage cartridge with said cartridge input aperture.

8. The apparatus of claim 5 wherein said cartridge loading means further comprises:

index rod means operable in synchronization with said gate means to force a data storage cartridge located in said interior portion of said cartridge loading means through said aperture created by said gate means located in said second side of said cartridge loading means being in said first position.

9. The apparatus of claim 1 wherein said cartridge queue means comprises:

first cartridge moving means located on said first side of said cartridge loading means and operable to force a plurality of data storage cartridges placed in said cartridge queue means against said first side of said cartridge loading means; and second cartridge moving means located on said second side of said cartridge loading means and operable to receive a plurality of data storage cartridges ejected into in said cartridge queue means from said second side of said cartridge loading means.

10. The apparatus of claim 9 wherein said first and said second cartridge moving means comprises:

spring loaded cartridge slide means for exerting a force of predetermined magnitude against said plurality of data storage cartridges placed in said cartridge queue means.

11. The apparatus of claim 1 wherein said cartridge loading means comprises a bidirectional feed mechanism wherein said cartridge loading means is also operable for receiving a data storage cartridge via said second side for loading said data storage cartridge into said associated cartridge drive via said cartridge input aperture.

12. The apparatus of claim 2 wherein said cartridge loading means further comprises:

single cartridge load means for receiving a single data storage into said interior portion of said cartridge loading means via an aperture formed in said cartridge loading means exclusive of said first and said second aperture means.

13. A method of operating an autoloader apparatus that automatically loads data storage cartridges into an associated cartridge drive via a cartridge input aperture formed in said cartridge drive, wherein said autoloader apparatus comprises a cartridge loading mechanism fixably mounted juxtaposed to said cartridge input aperture, having a first side and a second side, for receiving a data storage cartridge via said first side for loading said data storage cartridge into said associated cartridge drive via said cartridge input aperture, said first side and said second side being located on opposite sides of said cartridge loading mechanism along a horizontal axis, said method comprising the steps of:

loading a plurality of data storage cartridges in a cartridge queue oriented along said horizontal axis and juxtaposed to both said first side and said second side of said cartridge loading mechanism and comprising the steps of:

presenting a plurality of data storage cartridges, one at a time, to said cartridge loading mechanism at said first side thereof, and receiving a plurality of data storage cartridges ejected one at a time from said cartridge loading mechanism at said second side thereof.

14. The method of claim 1 wherein said method further comprises the steps of:

operating a first aperture formed in said first side of said cartridge loading mechanism to controllably present an opening to enable a one of said data storage cartridges to pass through from said cartridge queue to an interior portion of said cartridge loading mechanism; and operating a second aperture formed in said second side of said cartridge loading mechanism to controllably present an opening to enable a one of said data storage cartridges to pass through from an interior portion of said cartridge loading mechanism to said cartridge queue.

15. The method of claim 14 wherein said method further comprises the step of:

operating a drive roller to drive said data storage cartridge from said interior portion of said cartridge loading mechanism into said cartridge drive via said cartridge input aperture; and operating said drive roller to retrieve said data storage cartridge from said cartridge drive into said interior portion of said cartridge loading mechanism.

16. The method of claim 14 further comprising the step of:

separating a single data storage cartridge from at least one adjacent cartridge located in said cartridge queue at said first side of said cartridge loading mechanism to enable said single data storage cartridge to pass through said first aperture.

17. The method of claim 13 wherein further comprising the step of:

centering said data storage cartridge in said interior portion of said cartridge loading mechanism to align said data storage cartridge with said cartridge input aperture.

18. The method of claim 14 further comprising the step of:

forcing a data storage cartridge located in said interior portion of said cartridge loading mechanism through said aperture in said second side of said cartridge loading mechanism.

19. The method of claim 13 further comprising the steps of:

forcing a plurality of data storage cartridges placed in said cartridge queue against said first side of said cartridge loading mechanism; and receiving a plurality of data storage cartridges ejected into in said cartridge queue from said second side of said cartridge loading mechanism.

* * * * *